US007782598B2

(12) United States Patent
Yu

(10) Patent No.: US 7,782,598 B2
(45) Date of Patent: Aug. 24, 2010

(54) ELECTRONIC DEVICE ENCLOSURE

(75) Inventor: Shen-Chang Yu, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 12/401,724

(22) Filed: Mar. 11, 2009

(65) Prior Publication Data
US 2010/0102686 A1 Apr. 29, 2010

(30) Foreign Application Priority Data
Oct. 28, 2008 (CN) .................... 2008 1 0305250

(51) Int. Cl.
*G06F 1/16* (2006.01)
(52) U.S. Cl. ................ 361/679.01; 312/223.1
(58) Field of Classification Search ............ 361/679.01, 361/679.23
See application file for complete search history.

(56) References Cited
U.S. PATENT DOCUMENTS
5,682,290 A * 10/1997 Markow et al. ........ 361/679.55

| 5,715,139 | A | * | 2/1998 | Nakajima | 361/679.55 |
| 5,784,256 | A | * | 7/1998 | Nakamura et al. | 361/699 |
| 2003/0128503 | A1 | * | 7/2003 | Takahashi | 361/681 |
| 2005/0219808 | A1 | * | 10/2005 | Marler et al. | 361/683 |
| 2006/0291149 | A1 | * | 12/2006 | Suzuki et al. | 361/679 |
| 2007/0115619 | A1 | * | 5/2007 | Wang et al. | 361/679 |
| 2007/0133158 | A1 | * | 6/2007 | Oda et al. | 361/681 |

* cited by examiner

*Primary Examiner*—Lisa Lea-Edmonds
(74) *Attorney, Agent, or Firm*—Steven M. Reiss

(57) ABSTRACT

An electronic device enclosure includes a metallic body and a metallic speaker-receiving member. The metallic body includes a first side, a second side, and a crossbeam connecting the first side and the second side. A first connecting portion extends from the second side and parallel to the crossbeam. A distal portion of the first side define a first connecting plane. The first connecting portion defines a first connecting surface. The metallic speaker-receiving member includes a first sidewall and a second sidewall. The first sidewall defines a second connecting portion. A second connecting plane is defined by a bent distal end of the second sidewall. The second connecting plane is welded to the first connecting plane, and the second connecting portion is welded to the first connecting portion to securely attach the metallic speaker-receiving member to the metallic body. Such a configuration allows miniaturization of the electronic device enclosure.

8 Claims, 3 Drawing Sheets

ELECTRONIC DEVICE ENCLOSURE

BACKGROUND

1. Technical Field

The present disclosure relates to an electronic device enclosure.

2. Description of the Related Art

Some covers of mobile phones have an enclosure forming a chamber for receiving a speaker. The enclosures are usually formed of plastic using an injection molding method. Commonly, because of plastic's structural properties, the strength of the enclosures for the speaker is typically inadequate. In order to enhance the supporting strength, the thickness of the enclosures can be increased. However, miniaturization of the mobile phone becomes harder.

Therefore, there is room for improvement within the art.

BRIEF DESCRIPTION OF THE DRAWINGS

Many aspects of the present electronic device enclosure should be better understood with reference to the accompanying drawing. The components in the drawing are not necessarily drawn to scale, the emphasis instead being placed upon clearly illustrating the principles of the electronic device enclosure. Moreover, in the drawings, like reference numerals designate corresponding parts throughout the several views.

DETAILED DESCRIPTION

Figure 1:
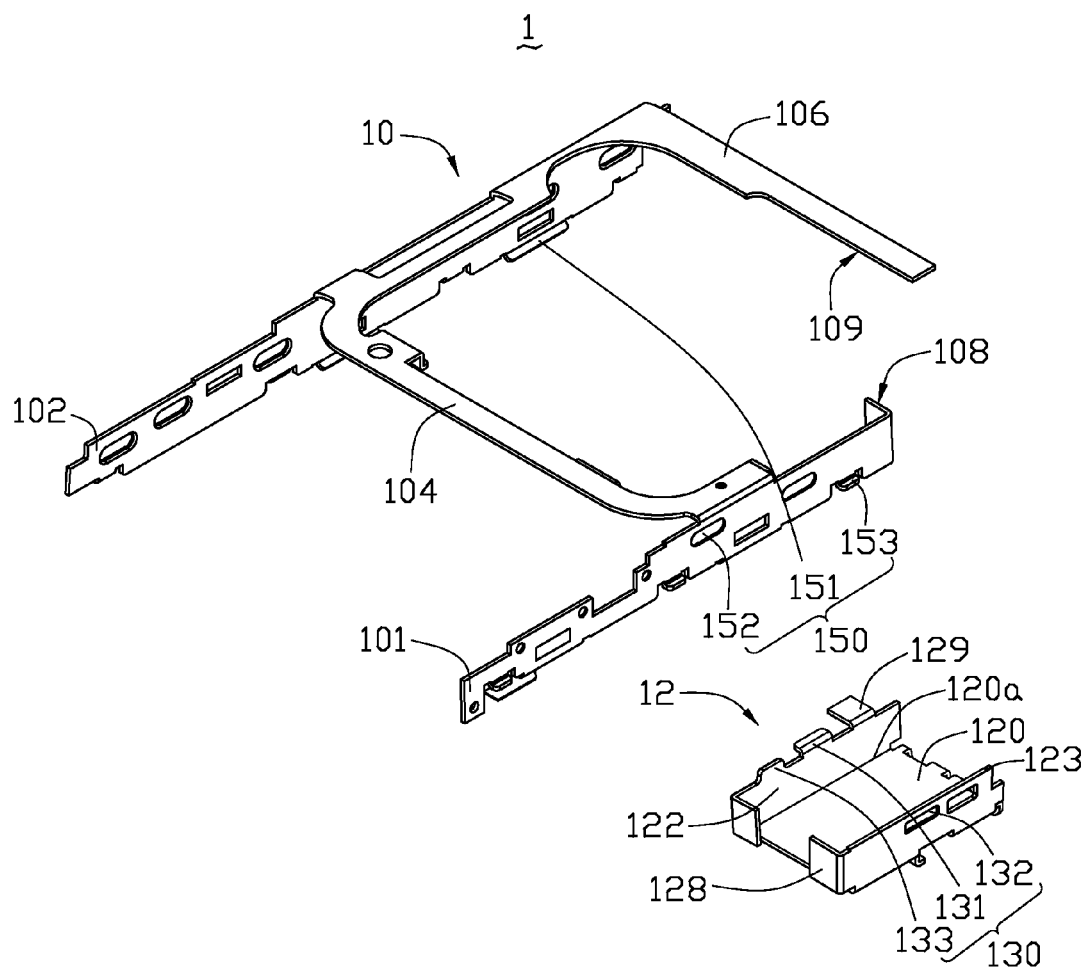
FIG. 1 is an exploded, isometric view of an electronic device enclosure, according to a first exemplary embodiment.

FIG. 1 shows an electronic device enclosure 1 in accordance with an exemplary embodiment. The electronic device enclosure 1 includes a metallic body 10 and a metallic speaker-receiving member 12. The metallic speaker-receiving member 12 is assembled to the metallic body 10 via welding method. In this embodiment, the metallic body 10 and the metallic speaker-receiving member 12 are made of aluminum-magnesium alloy.

The metallic body 10 includes a first side 101, a second side 102 substantially parallel to the first side 101, and a crossbeam 104 connected between the first side 101 and the second side 102. In this embodiment, the metallic body 10 further includes a first latching assembly 150. The first latching assembly 150 includes a first sliding piece 151 extending substantially perpendicular to the second side 102 and toward the first side 101, and at least one latching hook 153 defined on the first and second sides 101, 102. The first latching assembly 150 also defines at least one latching opening 152 in the first and second sides 101, 102 correspondingly. The first latching assembly 150 is configured for connecting to another portion, such as front cover (not shown), of the electronic device enclosure 1.

The metallic speaker-receiving member 12 includes a bottom sheet 120, a first sidewall 122 and a second sidewall 123 facing away from the first sidewall 122. The first sidewall 122 and the second sidewall 123 are substantially perpendicular to the bottom sheet 120. In this embodiment, the metallic speaker-receiving member 12 further includes a second latching assembly 130. The second latching assembly 130 includes a first sliding piece 131 extending outwards from the top edge of the first side wall 122 and being substantially perpendicular to the first sidewall 122 and a second latching hooks 133 protruding upwards from the top edge of the first sidewall 122. The second latching assembly 130 also defines two second latching openings 132 on the second sidewall 123. The second latching assembly 130 is configured for connecting to an external member, such as a cover (not shown) of the metallic speaker-receiving member 12.

A first connecting portion 106 is extended from an end of the second side 102 parallel to the crossbeam 104. The total length of the second side 123 and the first 101 is substantially equal to that of the second side 102 of the metallic body 10. The total length of the first connecting portion 106 and the width of the bottom sheet 120 of the metallic speaker-receiving member 12 is substantially equal to the length of the crossbeam 104. The first connecting portion 106 defines a first connecting surface 109. The first sidewall 122 defines a second connecting portion 129 corresponded to first connecting surface 109 of the metallic body 10. A distal portion of the first side 101 near the first connecting portion 106 is bent toward the second side 102 to define a first connecting plane 108. A second connecting plane 128 is defined by bending two distal ends of the first and second sidewall 122, 123 to a plane, i.e., the connecting plane 128.

Figure 2:
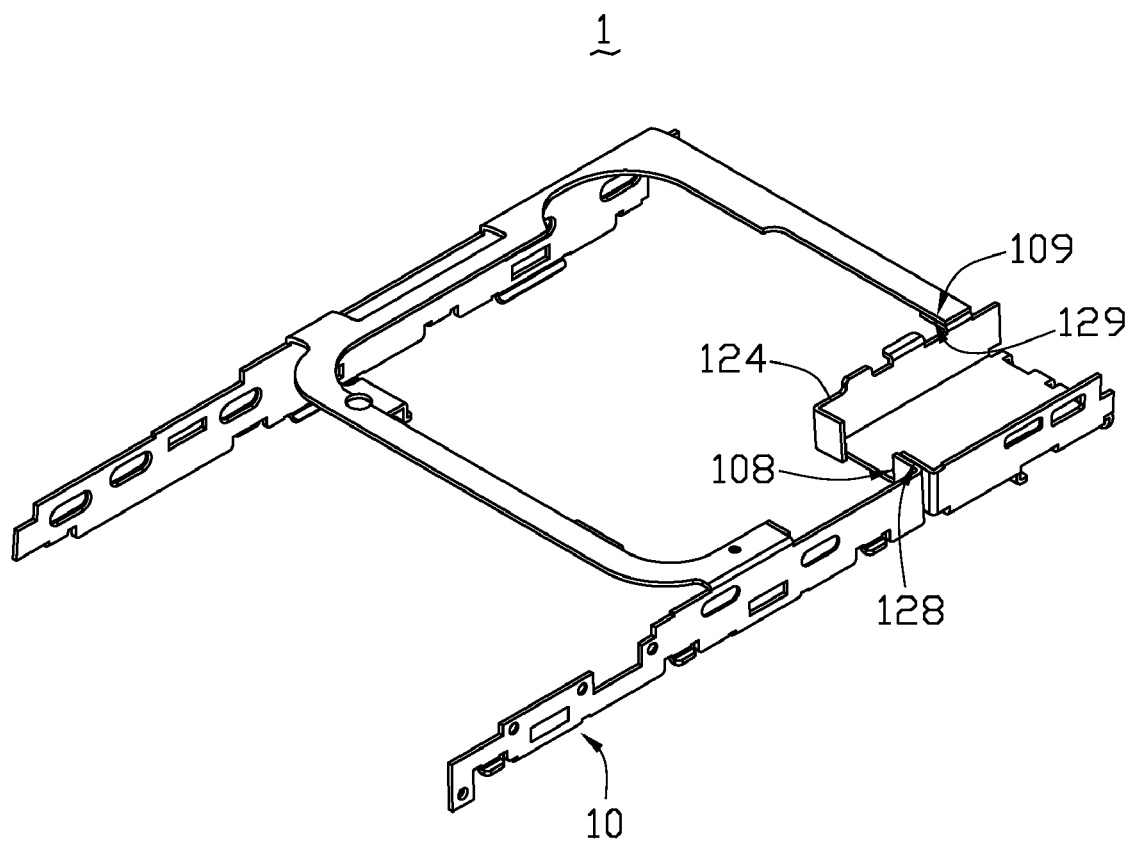
FIG. 2 is an assembled, isometric view of the electronic device enclosure of FIG. 1.

Referring to FIG. 2, in assembly, the second connecting portion 129 of the metallic speaker-receiving member 12 is welded to the first connecting portion 109 of the metallic body 10, and the second connecting plane 128 is welded to the first connecting plane 108, thereby, the metallic speaker-receiving member 12 is securely attached to the metallic body 10.

Figure 3:
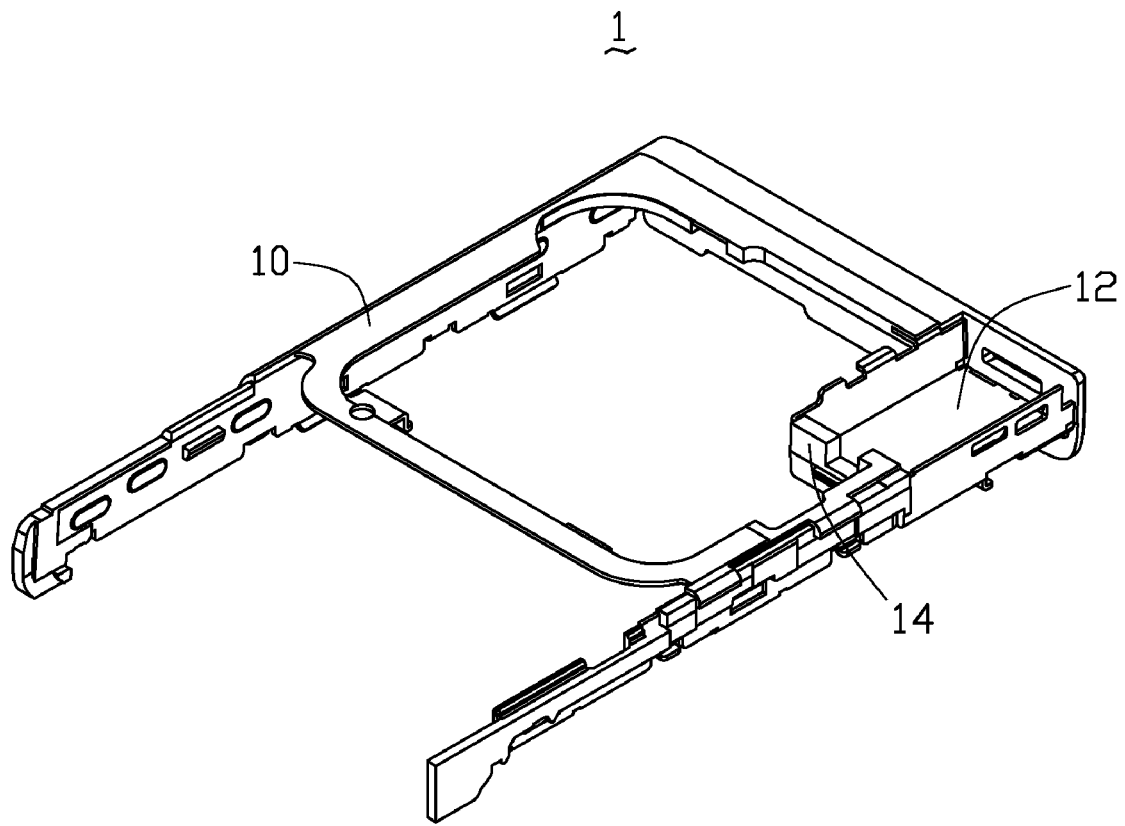
FIG. 3 is an assembled, isometric view of an electronic device enclosure, according to a second exemplary embodiment.

Referring to FIG. 3, in other embodiment, the electronic device enclosure 1 further includes an injection molded member 14, the injection molded member 14 is coated on the surface the metallic body 10 and the metallic speaker-receiving member 12 to prevent the metallic body 10 and the metallic speaker-receiving member 12 from oxidation. Because the electronic device enclosure 1 only uses one layer of molded member 14, the electronic device enclosure 1 can be miniaturized.

The metallic body 10 and the metallic speaker-receiving member 12 are separately formed, manufacturing the metallic body 10 is relatively simple. The metallic body 10 and the metallic speaker-receiving member 12 are made of metallic materials, thereby, the connecting strength is stronger than made of plastic materials, and is beneficial for miniaturization of the electronic device enclosure 1.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. A electronic device enclosure comprising:
   a metallic body comprising a first side, a second side substantially parallel to the first side, and a crossbeam connecting the first side and the second side, a first connecting portion extending from the second side and parallel to the crossbeam, a distal portion of the first side near the first connecting portion bent toward the second side to define a first connecting plane the first connecting portion defined a first connecting surface; and
   a metallic speaker-receiving member comprising a bottom sheet, a first sidewall, a second sidewall facing away from the first sidewall, the first and second sidewall substantially perpendicular to the bottom sheet, the first sidewall defining a second connecting portion corresponding to the first connecting surface of the metallic body, a second connecting plane being defined by a bent distal end of the second sidewall, the second connecting plane welded to the first connecting plane and the second connecting portion of the metallic body welded to the first connecting portion of the metallic speaker-receiving member to securely attach the metallic speaker-receiving member to the metallic body.

2. The electronic device enclosure as claimed in claim 1, wherein the metallic body and the metallic speaker-receiving member are made of aluminum-magnesium alloy.

3. The electronic device enclosure as claimed in claim 1, wherein the total length of the first connecting portion and the width of the bottom sheet of the metallic speaker-receiving member is equal to the length of the crossbeam.

4. The electronic device enclosure as claimed in claim 1, wherein the metallic body further comprises a first latching assembly, the first latching assembly is configured for connecting to another portion of the electronic device enclosure.

5. The electronic device enclosure as claimed in claim 4, wherein the first latching assembly comprises a first sliding piece extended substantially perpendicular to the second side and extended toward the first side, at least one latching opening defined on the first and second side, and at least one hook defined on the first and second side.

6. The electronic device enclosure as claimed in claim 1, wherein the metallic speaker-receiving member further comprises a second latching assembly, the second latching assembly is configured for connecting to external member of the metallic speaker-receiving member.

7. The electronic device enclosure as claimed in claim 1, wherein the second latching assembly comprises a first sliding piece extending outward from the top edge of the first sidewall and being extended toward the second side of the metallic body, two second latching openings defined on the second sidewall, and a second latching hook protruding upward from the top edge of the first sidewall.

8. The electronic device enclosure as claimed in claim 1, wherein the electronic device enclosure further comprises a injection molded member, the injection molded member is coated on the surface the metallic body and the metallic speaker-receiving member.

* * * * *